(12) United States Patent
Cha et al.

(10) Patent No.: US 11,201,009 B2
(45) Date of Patent: Dec. 14, 2021

(54) METHOD OF MANUFACTURING MULTILAYER CERAMIC ELECTRONIC COMPONENT

(71) Applicant: SAMSUNG ELECTRO-MECHANICS CO., LTD., Suwon-Si (KR)

(72) Inventors: Kyoung Jin Cha, Suwon-Si (KR); Seung Heui Lee, Suwon-Si (KR); Hyun Soo Oh, Suwon-Si (KR); Hyung Soon Kwon, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/149,124

(22) Filed: Oct. 1, 2018

(65) Prior Publication Data

US 2020/0043655 A1 Feb. 6, 2020

(30) Foreign Application Priority Data

Aug. 6, 2018 (KR) .................. 10-2018-0091192

(51) Int. Cl.
| | |
|---|---|
| *H01G 4/012* | (2006.01) |
| *H01G 4/30* | (2006.01) |
| *H01G 4/12* | (2006.01) |
| *H01G 4/232* | (2006.01) |
| *H01G 4/248* | (2006.01) |

(52) U.S. Cl.
CPC .............. *H01G 4/012* (2013.01); *H01G 4/12* (2013.01); *H01G 4/232* (2013.01); *H01G 4/248* (2013.01); *H01G 4/30* (2013.01)

(58) Field of Classification Search
CPC ........ H01G 4/0085; H01G 4/012; H01G 4/12; H01G 4/232; H01G 4/248
See application file for complete search history.

(56) References Cited

U.S. PATENT DOCUMENTS

| | | | |
|---|---|---|---|
| 6,295,196 B1 | 9/2001 | Hamaji et al. | |
| 6,331,929 B1 | 12/2001 | Masuda | |
| 6,785,941 B2* | 9/2004 | Nakamura | .............. B32B 18/00 29/25.42 |

(Continued)

FOREIGN PATENT DOCUMENTS

| | | |
|---|---|---|
| JP | H09-035985 A | 2/1997 |
| JP | 2000-269066 A | 9/2000 |

(Continued)

*Primary Examiner* — Minh N Trinh
(74) *Attorney, Agent, or Firm* — Morgan, Lewis & Bockius LLP

(57) ABSTRACT

A method of manufacturing a multilayer ceramic electronic component includes preparing a ceramic green sheet containing a ceramic powder and forming an internal electrode pattern on the ceramic green sheet using a conductive paste containing conductive metal particles and an additive. A ceramic laminate is formed by stacking the ceramic green sheets on which the internal electrode pattern is formed. A ceramic body including dielectric layers and internal electrodes is formed by sintering the ceramic laminate. An average number of conductive metal particles in the internal electrode pattern in a thickness direction is more than 2 and 5 or less.

9 Claims, 5 Drawing Sheets

(56) References Cited

U.S. PATENT DOCUMENTS

| | | | | |
|---|---|---|---|---|
| 7,131,174 | B2* | 11/2006 | Kobayashi | H01G 4/30 29/25.42 |
| 8,102,639 | B2* | 1/2012 | Kasuya | H01G 4/005 29/25.42 |
| 8,484,815 | B2* | 7/2013 | Takeuchi | H01G 4/005 29/25.42 |
| 2013/0038983 | A1* | 2/2013 | Kim | H01B 1/16 361/321.1 |
| 2016/0087189 | A1* | 3/2016 | Lee | H01G 4/30 310/365 |
| 2020/0043655 | A1* | 2/2020 | Cha | H01G 4/232 |

FOREIGN PATENT DOCUMENTS

| | | |
|---|---|---|
| JP | 2004-079994 A | 3/2004 |
| JP | 2005-167290 A | 6/2005 |

* cited by examiner

METHOD OF MANUFACTURING MULTILAYER CERAMIC ELECTRONIC COMPONENT

CROSS-REFERENCE TO RELATED APPLICATION(S)

This application claims benefit of priority to Korean Patent Application No. 10-2018-0091192 filed on Aug. 6, 2018 in the Korean Intellectual Property Office, the disclosure of which is incorporated herein by reference in its entirety.

TECHNICAL FIELD

The present disclosure relates to a multilayer ceramic electronic component and a method of manufacturing the same, and more particularly, to a multilayer ceramic electronic component having excellent reliability and a method of manufacturing the same.

BACKGROUND

In general, electronic components using a ceramic material, such as capacitors, inductors, piezoelectric elements, varistors, thermistors, or the like, include a ceramic body formed of a ceramic material, internal electrodes formed in the ceramic body, and external electrodes disposed on a surface of the ceramic body to be connected to the internal electrodes.

Among multilayer ceramic electronic components, a multilayer ceramic capacitor includes a plurality of stacked dielectric layers, internal electrodes disposed to face each other with each of the dielectric layers interposed therebetween, and external electrodes electrically connected to the internal electrodes.

The multilayer ceramic capacitor has been widely used as components of mobile communications devices such as a computer, a personal digital assistant (PDA), a cellular phone, or the like, due to advantages such as a small size, a high capacitance, an easy mounting feature, and the like.

Recently, in accordance with improvement in performance of an electric or electronic device and thinness and lightness of the electric or electronic device, small sized, high performance, and super-capacitance electronic components have been demanded.

Particularly, a technology of significantly increasing capacitance per unit volume has been required in accordance with high capacitance and miniaturization of the multilayer ceramic capacitor.

Therefore, there is a need to increase the number of stacked internal electrodes to implement high capacitance by significantly decreasing a volume of the internal electrode while significantly increasing an area thereof.

However, since the thinner the internal electrode, the lower the ratio of the thickness to the area, sintering driving force is increased, and thus, problems such as electrode disconnection and electrode aggregation may be significantly increased.

Therefore, in order to implement a high-capacitance multilayer ceramic capacitor, there is a need to develop a method capable of implementing a multilayer ceramic capacitor having high reliability, a small size, and high capacitance by suppressing an electrode disconnection phenomenon and an electrode aggregation phenomenon corresponding to problems at the time of forming thin internal electrodes.

SUMMARY

An aspect of the present disclosure may provide a method of manufacturing multilayer electronic component, and more particularly, to a method of manufacturing a multilayer ceramic electronic component having excellent reliability.

According to an aspect of the present disclosure, a method of manufacturing a multilayer ceramic electronic component may include: preparing a ceramic green sheet containing a ceramic powder; forming an internal electrode pattern on the ceramic green sheet using a conductive paste containing conductive metal particles and an additive; forming a ceramic laminate by stacking the ceramic green sheets on which the internal electrode pattern is formed; and forming a ceramic body including dielectric layers and internal electrodes by sintering the ceramic laminate. An average number of conductive metal particles in the internal electrode pattern in a thickness direction may be more than 2 and 5 or less.

According to an aspect of the present disclosure, a multilayer ceramic electronic component may include a ceramic body including dielectric layers stacking on a thickness direction of the ceramic body, and first and second internal electrodes alternatively disposed with one of the dielectric layers disposed therebetween and exposed from at least one surface of the ceramic body; and first and second external electrodes electrically connected to the first and second internal electrode, respectively. An average number of conductive metal particles in one of the first and second internal electrodes in the thickness direction may be more than 2 and 5 or less.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

An exemplary embodiment in the present disclosure relates to a ceramic electronic component, and an example of an electronic component using a ceramic material includes a capacitor, an inductor, a piezoelectric element, a varistor, a thermistor, or the like. Hereinafter, a multilayer ceramic capacitor will be described as an example of the ceramic electronic component.

Figure 1:
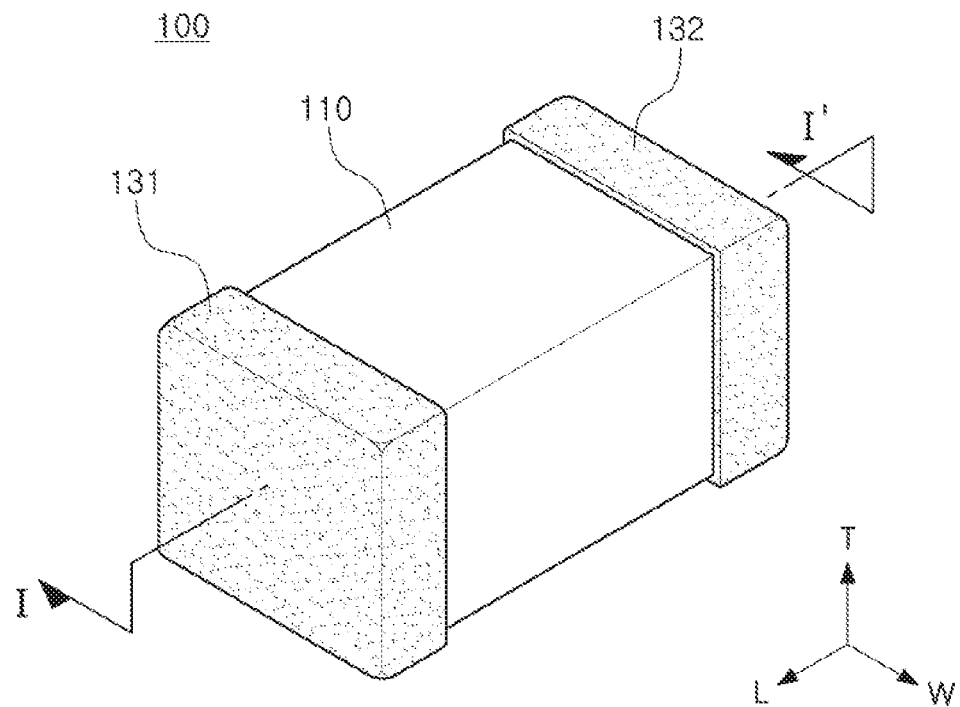
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
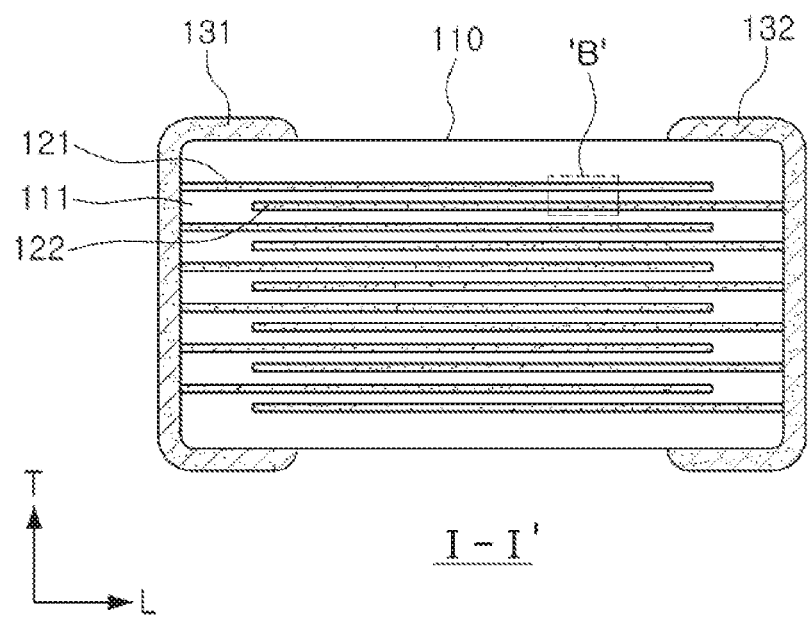
FIG. 2 is a schematic cross-sectional view illustrating the multilayer ceramic capacitor taken along line I-I' of FIG. 1.

FIG. 2 is a schematic cross-sectional view illustrating the multilayer ceramic capacitor taken along line I-I' of FIG. 1.

Figure 3:
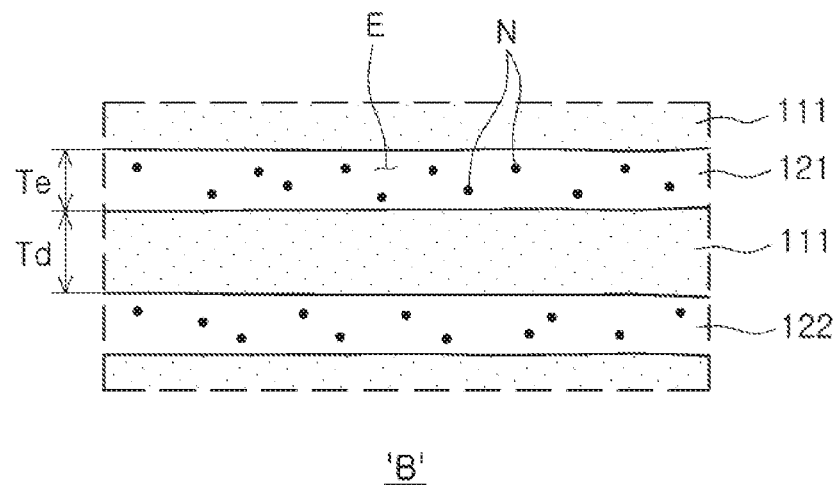
FIG. 3 is an enlarged view of part B of FIG. 2.

FIG. 3 is an enlarged view of part B of FIG. 2.

Referring to FIGS. 1 through 3, a multilayer ceramic capacitor 100 according to the exemplary embodiment in the present disclosure may include a ceramic body 110, internal electrodes 121 and 122 formed in the ceramic body, and external electrodes 131 and 132 formed on an outer portion of the ceramic body 110.

According to the exemplary embodiment in the present disclosure, a 'length' direction of the multilayer ceramic capacitor refers to an 'L' direction of FIG. 1, a 'width' direction thereof refers to a 'W' direction of FIG. 1, and a 'thickness' direction thereof refers to a 'T' direction of FIG. 1. The 'thickness direction' is the same as a direction in which dielectric layers are stacked, that is, the 'stacking direction'.

A shape of the ceramic body 110 is not particularly limited, but according to the exemplary embodiment in the present disclosure, the ceramic body 110 may have a hexahedral shape.

The ceramic body 110 may be formed by stacking a plurality of dielectric layers 111.

The plurality of dielectric layers 111 configuring the ceramic body 110 may be in a sintered state, and adjacent dielectric layers may be integrated with each other so that boundaries therebetween are not readily apparent.

The dielectric layer 111 may be formed by sintering of a ceramic green sheet containing a ceramic powder.

The ceramic powder is not particularly limited as long as it is generally used in the art.

Although not limited thereto, an example of the ceramic powder may include $BaTiO_3$-based ceramic powder.

Examples of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, or the like, is partially solid-dissolved in $BaTiO_3$, but are not limited thereto.

In addition, the ceramic green sheet may contain a transition metal, a rare earth element, Mg, Al, or the like, in addition to the ceramic powder.

A thickness of one dielectric layer 111 may be suitably changed according to a capacitance design of the multilayer ceramic capacitor.

Although not limited thereto, a thickness of a dielectric layer 111 formed between two internal electrode layers adjacent to each other after sintering may be, for example, 0.4 μm or less.

In the exemplary embodiment in the present disclosure, the thickness of the dielectric layer 111 may mean an average thickness.

The average thickness of the dielectric layer 111 may be measured from an image obtained by scanning a cross section of the ceramic body 110 in the length direction using a scanning electron microscope (SEM) as illustrated in FIG. 2.

For example, a thickness at the predetermined number of points, for example, thirty points, that are equidistant from each other in the length direction may be measured, with respect to the dielectric layer randomly sampled from the image obtained by scanning a cross-section of the ceramic body 110 in a length-thickness (L-T) direction taken along a central portion of the ceramic body 110 in the width (W) direction using the scanning electron microscope (SEM), thereby determining the average thickness of one dielectric layer by dividing a sum of thicknesses measured at the predetermined number of points by the predetermined number, as illustrated in FIG. 2.

The thirty points that are equidistant from each other may be measured in a capacitance forming part that means an area in which internal electrodes 121 and 122 overlap each other.

In addition, when an average thickness of ten or more dielectric layers is measured by the above-mentioned method, the average thickness of the dielectric layer may be further generalized.

The internal electrodes 121 and 122 may be disposed in the ceramic body 110.

The internal electrodes 121 and 122 may be formed on the ceramic green sheet, stacked, and sintered to thereby be formed in the ceramic body 110 with each of the dielectric layers interposed therebetween.

The internal electrodes may be composed of pairs of first and second internal electrodes 121 and 122 having different polarities from each other, and disposed to face each other in the stacking direction of the dielectric layers.

As illustrated in FIG. 2, distal ends of first and second internal electrodes 121 and 122 may be alternately exposed to surfaces of the ceramic body 110 in the length direction.

In addition, although not illustrated, according to the exemplary embodiment in the present disclosure, the first and second internal electrodes may have lead portions and be exposed to the same surface of the ceramic body through the lead portions. Alternatively, the first and second internal electrodes may have the lead portions and be exposed to at least one surface of the ceramic body through the lead portions.

A thickness of a single internal electrode 121 or 122 is not particularly limited, but may be, for example, 0.4 μm or less.

According to the exemplary embodiment in the present disclosure, 200 or more dielectric layers on which the internal electrode is formed may be stacked.

According to the exemplary embodiment in the present disclosure, there is suggested a characteristic configuration for suppressing an electrode disconnection phenomenon and an electrode aggregation phenomenon caused by thin internal electrode when the thickness of the single internal electrode 121 or 122 is 0.4 μm or less. When the single internal electrode 121 or 122 is more than 0.4 μm, even though the characteristic configuration according to the present disclosure is not applied, problems such as a capacitance problem and reliability deterioration may not occur.

That is, a characteristic configuration according to the present disclosure described below may be applied in order to secure high capacitance and improve reliability when the thickness of the single internal electrode 121 or 122 is 0.4 µm or less.

According to the exemplary embodiment in the present disclosure, the external electrodes 131 and 132 may be formed on the outer portion of the ceramic body 110 and electrically connected to the internal electrodes 121 and 122.

More specifically, the external electrodes may be composed of a first external electrode 131 electrically connected to the first internal electrode 121 exposed to one surface of the ceramic body 110 and a second external electrode 132 electrically connected to the second internal electrode 122 exposed to the other surface thereof.

In addition, although not illustrated, a plurality of external electrodes may be formed in order to be connected to the first and second internal electrodes exposed to the ceramic body.

The external electrodes 131 and 132 may be formed of a conductive paste containing metal powder.

The metal powder contained in the conductive paste is not particularly limited. For example, Ni, Cu, or an alloy thereof may be used.

A thickness of the external electrodes 131 and 132 may be appropriately determined depending on the use, or the like. For example, the thickness may be about 10 to 50 µm.

Referring to FIG. 3, in a cross section (L-T cross section) of the ceramic body in a length-thickness direction, a region in which an additive and other sintering aids are trapped in the internal electrodes 121 and 122 may refer to as a non-electrode region N, and the other region except for the non-electrode region N in the internal electrodes 121 and 122 may refer to as an electrode region E.

A conductive metal such as nickel, the additive, other sintering aids, and the like, may be added to a conductive paste for an internal electrode, and the region in which the additive and the sintering aids may be trapped in the internal electrode may be the non-electrode region N.

The non-electrode region N may contain materials such as a ceramic powder, a binder, a solvent, and the like, other than the conductive metal used as the internal electrode, and may be an empty space such as a void.

In a case in which the additive is enclosed by a conductive metal, more specifically, nickel powder particles, the additive is not released to the outside of the internal electrode but may be trapped in the internal electrode during the sintering, which may form the non-electrode region N.

An area of the non-electrode region N may be considered to be a barometer of a content of a material configuring the non-electrode region N. In detail, a content of the additive added in the internal electrodes 121 and 122 may be estimated.

The non-electrode region N may contain a ceramic additive added to the internal electrodes 121 and 122. A ceramic additive powder may move from the internal electrode to the ceramic body during the sintering, and in order to prevent characteristics of the dielectric layer from being deteriorated, the same kind as the ceramic powder forming the dielectric layer may be used. Although not limited thereto, an example of the ceramic additive powder may include a barium titanate powder.

Some of the ceramic additive powder may be pushed out to surfaces of the internal electrodes 121 and 122 to thereby be sintered together with the ceramic powder forming the dielectric layer, but some of the ceramic additive powder is not released between metal powder particles but may be trapped in a grain boundary until the sintering is completed. Therefore, the ceramic additive powder may form the non-electrode region in the internal electrodes 121 and 122.

The multilayer ceramic capacitor 100 according to the exemplary embodiment in the present disclosure may be a micro-sized and high-capacitance product in which the thickness of the dielectric layer 111 is 0.4 µm or less and the thickness of the first and second internal electrodes 121 and 122 is 0.4 µm or less, but is not necessarily limited thereto.

That is, since the multilayer ceramic capacitor 100 according to the exemplary embodiment in the present disclosure is a micro-sized and high-capacitance product, the dielectric layers 111 and the first and second internal electrodes 121 and 122 may be formed of thin layers having thin thicknesses as compared to a product according to the related art. In a product in which thin dielectric layers and thin internal electrodes are used as described above, problems such as a decrease in capacitance and deterioration of reliability due to shrinkage in the thickness direction occurring during the sintering of the internal electrode are important issues.

That is, since in a multilayer ceramic capacitor according to the related art, dielectric layers and internal electrodes have relatively thicker thickness than those of the dielectric layers and the internal electrodes included in the multilayer ceramic capacitor according to the exemplary embodiment in the present disclosure, a decrease in capacitance and deterioration of reliability due to shrinkage in the thickness direction occurring during the sintering of the internal electrode were not considered to be big problems.

However, in a product using thin layers in which thin dielectric layers and thin internal electrodes as in the exemplary embodiment in the present disclosure, in order to secure high capacitance and improve reliability, there is a need to control shrinkage of the internal electrode in the thickness direction during the sintering.

In general, shrinkage of internal electrode in a thickness direction is increased, which is advantageous for implementing connectivity of the internal electrodes.

Therefore, shrinkage in the thickness direction may be induced by maintaining the number of conductive metal particles in an internal electrode paste in the thickness direction of the internal electrode to be a predetermined number or more.

However, as an internal electrode pattern coating layer is thinned, there is a limitation in increasing the number of conductive metal particles in the thickness direction.

In order to increase the number of conductive metal particles in a state in which the internal electrode pattern coating layer is thin, there is a need to use fine conductive metal particles, but in a case of using the fine particles, side effects such as cracks occurring due to an increase in specific surface area of the conductive metal particles and a decrease in connectivity of the internal electrodes due to a decrease in sintering initiation temperature may occur.

Therefore, in the product using thin layers in which the thickness of the dielectric layer 111 is 0.4 µm or less and the thickness of the first and second internal electrodes 121 and 122 is 0.4 µm or less after the sintering, there is a need to adjust an average number of conductive metal particles disposed in the internal electrode pattern coating layer in the thickness direction.

That is, in the embodiment in the present disclosure, the conductive metal particles may be disposed so that the average number of conductive metal particles in the internal electrode pattern in the thickness direction is more than 2 and or less, such that the problems such as electrode disconnection and electrode aggregation may be solved even in the thin layers in which the thicknesses of the dielectric layers 111 and the internal electrodes 121 and 122 are 0.4 μm or less.

Therefore, connectivity of the electrodes may not be deteriorated, such that a multilayer ceramic electronic component having high capacitance and excellent reliability may be implemented.

However, the term "thin layer" does not mean that the thicknesses of the dielectric layer 111 and the first and second internal electrodes 121 and 122 are 0.4 μm or less, but may be understood as a concept including dielectric layers and internal electrodes having a thin thickness as compared to a product according to the related art.

Figure 4:
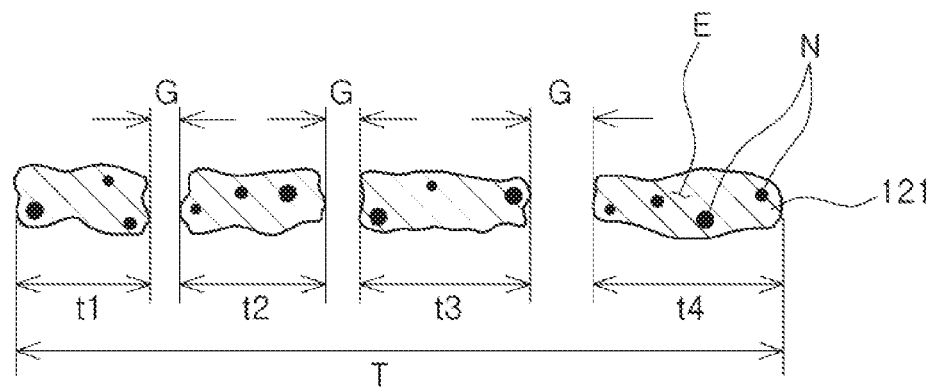
FIG. 4 is a mimetic view illustrating connectivity of internal electrodes.

FIG. 4 is a mimetic view illustrating connectivity of internal electrodes.

Referring to FIG. 4, connectivity of the internal electrode defined as a ratio of a length of an actual electrode to a total length of the internal electrode 121 or 122 may be 80% or more.

According to the exemplary embodiment in the present disclosure, connectivity of the internal electrode may be defined as a ratio of a length of a portion at which the internal electrode is actually formed to the total length of the internal electrode (the length of the portion at which the internal electrode is actually formed/the total length of the internal electrode).

Referring to FIG. 4, the total length of the internal electrode and the length of the portion at which the internal electrode is actually formed may be measured using an optical image obtained by scanning the cross-section of the multilayer ceramic capacitor as described above.

More specifically, the ratio of the length of the portion at which the internal electrode is actually formed to the entire length of the internal electrode may be measured from the image obtained by scanning the cross-section of the ceramic body in the length direction, taken along the central portion of the ceramic body in the width direction.

In more detail, when the total length of the internal electrode 121 including the voids at a specific region of the internal electrode 121 is defined as T and lengths of portions at which the internal electrode 121 is actually formed are defined as t1, t2, t3, . . . tn, connectivity of the internal electrode 121 may be indicated as (t1+t2+t3+•+tn)/T. Although the portions at which the internal electrode 121 is actually formed are represented by t1, t2, t3, and t4 in FIG. 4, but the number of portions at which the electrode is actually formed is not particularly limited.

The actual length of the internal electrodes 121 may be measured by subtracting lengths of gaps G from the total length T of the internal electrodes 121.

According to the embodiment in the present disclosure, connectivity of the electrode may not be deteriorated by allowing the connectivity of the internal electrode defined as the ratio of the length of the actual internal electrode to the total length of the internal electrode 121 or 122 even in the case of thin layers in which the thicknesses of the dielectric layer 111 and the internal electrodes 121 and 122 are 0.4 μm or less, such that the multilayer ceramic electronic component having high capacitance and excellent reliability may be implemented.

Hereinafter, a method of manufacturing a multilayer ceramic capacitor for implementing a distinctive portion of the present disclosure will be described in more detail.

A method of manufacturing a multilayer ceramic electronic component according to an exemplary embodiment in the present disclosure may include: preparing a ceramic green sheet containing a ceramic powder, forming an internal electrode pattern on the ceramic green sheet using a conductive paste containing conductive metal particles and an additive, forming a ceramic laminate by stacking the ceramic green sheets on which the internal electrode pattern is formed, and forming a ceramic body including dielectric layers and internal electrodes by sintering the ceramic laminate, wherein the conductive metal particles are disposed so that an average number of conductive metal particles in the internal electrode pattern in a thickness direction is more than 2 and 5 or less.

The conductive paste for forming an internal electrode may contain a conductive metal and the additive in order to suppress shrinkage of the internal electrode at the time of sintering.

The additive is not particularly limited as long as it may suppress shrinkage of the internal electrode at the time of sintering. For example, the additive may be one or more of base metals and metal oxides.

Specific examples of the base metals and the metal oxides may include barium titanate ($BaTiO_3$), $ZrO_2$, $Al_2O_3$, TiN, SiN, AlN, TiC, SiC, and WC, but are not necessarily limited thereto.

According to the related art, a conductive paste contains the base metal, the metal oxide, and the like, such that shrinkage of an internal electrode may be suppressed.

However, according to the exemplary embodiment in the present disclosure, the electrode aggregation phenomenon and the electrode disconnection phenomenon may be prevented by controlling the number of conductive metal particles so that the average number of conductive metal particles in the internal electrode pattern in the thickness direction is more than 2 and 5 or less, such that connectivity of the electrode may not be deteriorated, and thus, the multilayer ceramic electronic component having high capacitance and excellent reliability may be implemented.

More specifically, according to the exemplary embodiment in the present disclosure, the conductive metal particles may be disposed so that the average number of the conductive metal particles in the internal electrode pattern in the thickness direction is 3 or more to 5 or less.

The conductive metal particles may be disposed so that the number of the conductive metal particles in the internal electrode pattern in the thickness direction is more than 2 and 5 or less, such that a growth rate and movement of a grain boundary of the internal electrode during the sintering of the internal electrodes may be controlled unlike the related art. Therefore, the electrode disconnection phenomenon and the electrode aggregation phenomenon may be more effectively decreased as compared to the related art.

More preferably, the conductive metal particles may be disposed in the internal electrode pattern so that the number of the conductive metal particles in the internal electrode pattern in the thickness direction is more than 3 and 5 or less.

When the number of conductive metal particles disposed in the internal electrode pattern in the thickness direction is 3, the disconnection phenomenon and the electrode aggregation phenomenon may be decreased, but when the number of conductive metal particles disposed in the internal electrode pattern in the thickness direction is more than 3, the electrode disconnection phenomenon and the electrode aggregation phenomenon may be more effectively decreased.

When the number of conductive metal particles disposed in the internal electrode pattern in the thickness direction is 2 or less, since the number of conductive metal particles in the internal electrode in the thickness direction is insufficient, initially, empty spaces may be formed in the electrode, and thus, connectivity of the electrode may be deteriorated.

In this case, connectivity of the internal electrode may be less than 80%, such that a high-capacitance multilayer ceramic capacitor may not be implemented.

When the number of conductive metal particles disposed in the internal electrode pattern in the thickness direction of the internal electrode is more than 5, using fine conductive metal powder may be required. In this case, since an initial sintering property is increased, the electrode may be shrunk at a relatively low temperature, such that connectivity of the electrode is decreased after the sintering, and cracks of the multilayer ceramic capacitor may occur due to an increase in specific surface area of the conductive metal particles.

Hereinafter, the method of manufacturing a multilayer ceramic capacitor according to the exemplary embodiment in the present disclosure will be described with reference to FIG. 8.

Figure 8:
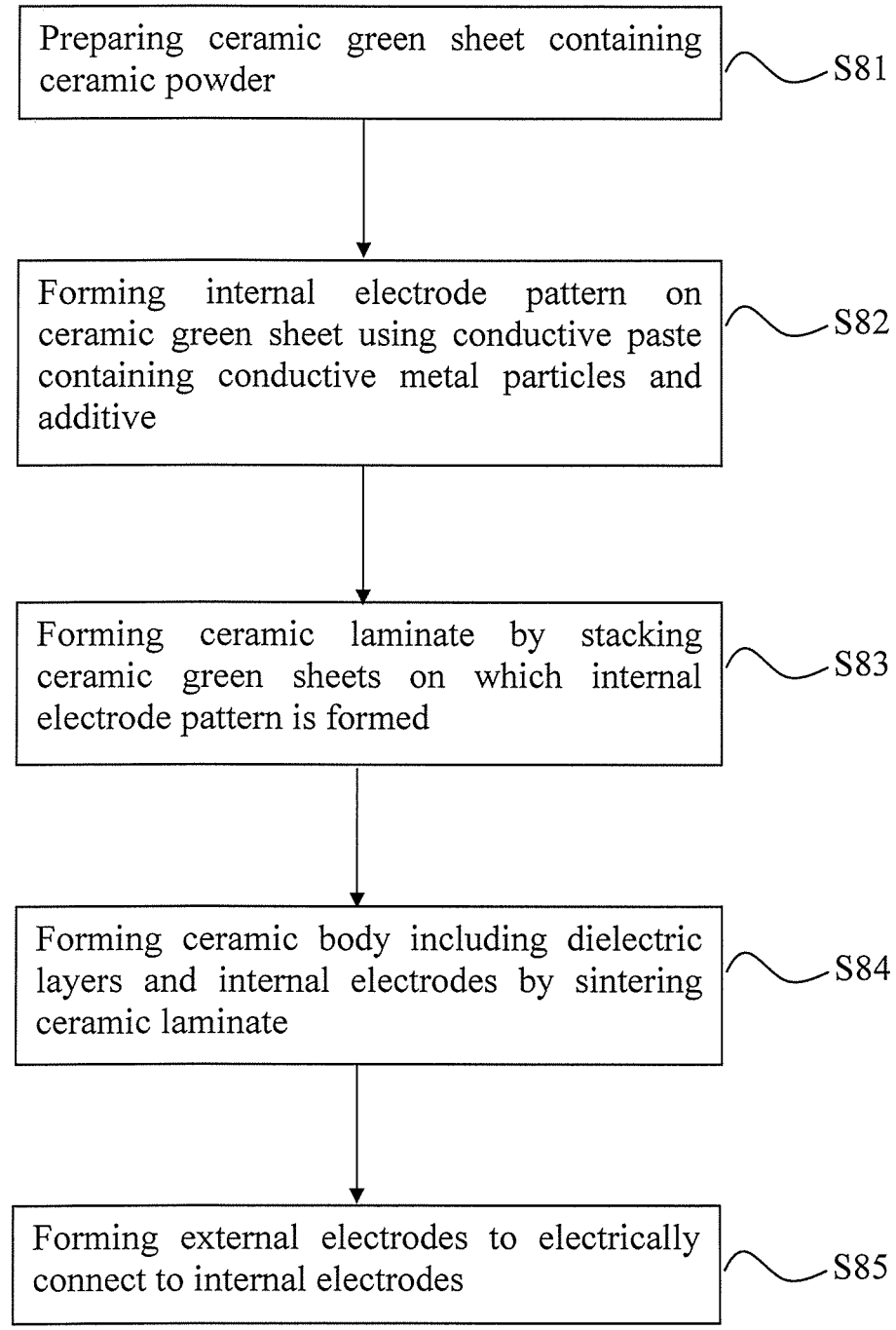
FIG. 8 is a flow chart illustrating process steps of a method to manufacture a multilayer ceramic capacitor according to an exemplary embodiment in the present disclosure.

FIG. 8 is a flow chart illustrating process steps of a method to manufacture a multilayer ceramic capacitor according to an exemplary embodiment in the present disclosure.

According to the exemplary embodiment in the present disclosure, a plurality of ceramic green sheets may be prepared (S81).

The ceramic green sheet may be manufactured in a sheet form having a thickness of several µm by mixing a ceramic powder, a binder, a solvent, and the like, to prepare slurry and applying the slurry using a doctor blade method. Thereafter, the ceramic green sheet may be sintered to form a dielectric layer 111 as illustrated in FIG. 2.

A thickness of the ceramic green sheet may be 0.6 µm or less, and thus, a thickness of the dielectric layer after the sintering may be 0.4 µm or less.

Ceramic powder particles may be disposed in the ceramic green sheet so that an average number of the ceramic powder particles in a thickness direction is 2 or more to 10 or less.

The ceramic powder particles may be disposed in the ceramic green sheet so that the average number of the ceramic powder particles in the thickness direction is 2 or more, such that a multilayer ceramic capacitor having excellent withstand voltage characteristics, a small size, and high capacitance may be implemented.

When the average number of ceramic powder particles in the ceramic green sheet in the thickness direction is less than 2, the withstand voltage characteristics may be deteriorated.

When the average number of ceramic powder particles in the ceramic green sheet in the thickness direction is more than 10, since it may be difficult to disperse the ceramic powder particles due to atomization of the ceramic powder particles, it may be difficult to form a uniform dielectric layer.

Next, the internal electrode pattern may be formed by applying the conductive paste for an internal electrode onto the ceramic green sheet (S82). The internal electrode pattern may be formed by a screen printing method or a gravure printing method.

The conductive paste for an internal electrode may contain the conductive metal and the additive, and the additive may be one or more of the base metals and the metal oxides.

The conductive metal may include nickel. The additive may include barium titanate or strontium titanate as the metal oxide.

A thickness of the internal electrode pattern may be 0.5 µm or less, and thus, a thickness of the internal electrode after the sintering may be 0.4 µm or less.

Then, the ceramic green sheet on which the internal electrode pattern is formed may be stacked, pressed in a stacking direction, and compressed (S83). Therefore, the ceramic laminate in which the internal electrode pattern is formed may be manufactured.

Next, the ceramic laminate may be cut per a region corresponding to one capacitor to thereby be formed in a chip form.

Here, the ceramic laminate may be cut so that one ends of the internal electrode patterns are alternately exposed to end surfaces of the cut ceramic laminate.

Next, the ceramic body may be manufactured by sintering the laminate in the chip form (S84).

The sintering may be performed under a reduction atmosphere. In addition, the sintering may be performed while adjusting a heating rate, and the heating rate may be 30° C./60 s to 50° C./60 s at a temperature of 700° C. or less, but is not limited thereto.

According to the exemplary embodiment in the present disclosure, the conductive metal particles may be disposed so that the average number of the conductive metal particles in the internal electrode pattern in the thickness direction is 3 or more to 5 or less.

The conductive metal particles may be disposed so that the number of the conductive metal particles in the internal electrode pattern in the thickness direction is more than 2 and 5 or less, such that a growth rate and movement of a grain boundary of the internal electrode during the sintering of the internal electrode may be controlled unlike the related art. Therefore, the electrode disconnection phenomenon and the electrode aggregation phenomenon may be more effectively decreased as compared to the related art.

More preferably, the conductive metal particles may be disposed in the internal electrode pattern so that the number of the conductive metal particles in the internal electrode pattern in the thickness direction is more than 3 and 5 or less.

When the number of conductive metal particles disposed in the internal electrode pattern in the thickness direction is 3, the disconnection phenomenon and the electrode aggregation phenomenon may be decreased, but when the number of conductive metal particles disposed in the internal electrode pattern in the thickness direction is more than 3, the electrode disconnection phenomenon and the electrode aggregation phenomenon may be more effectively decreased.

Thereafter, the external electrodes may be formed to be electrically connected to the internal electrodes exposed to end surfaces of the ceramic body while covering the end surfaces of the ceramic body (S85). Thereafter, plating layers formed of nickel, tin, or the like, may be formed on surfaces of the external electrodes.

Hereinafter, the present invention will be described in detail with reference to Inventive Examples and Comparative Examples.

Multilayer ceramic capacitors according to Inventive Examples and Comparative Examples were prepared as follows.

Barium titanate powder, ethanol as an organic solvent, and polybutyral as a binder were mixed and ball-milled to prepare ceramic slurry, and a ceramic green sheet was manufactured using the ceramic slurry.

An internal electrode was formed by printing a conductive paste for an internal electrode containing nickel on the ceramic green sheet, and a green sheet laminate formed by stacking these green sheets was isostatically pressed at a pressure of 1,000 kgf/cm² at 85° C.

A green chip was formed by cutting the compressed green sheet laminate, and the cut green chip was subjected to a de-binder process of being maintained at 230° C. for 60 hours under an air atmosphere. Thereafter, the green chip was sintered at 1000° C., thereby manufacturing a sintered chip. The sintering was performed under reducing atmosphere so as to prevent oxidation of the internal electrode, and in the reducing atmosphere, the pressure was $10^{-11}$ to $10^{-10}$ atm lower than Ni/NiO equilibrium oxygen partial pressure.

An external electrode was formed on an external portion of the sintered chip using a paste for an external electrode containing copper powder and glass powder, and a nickel plating layer and a tin plating layer were formed on the external electrode by electroplating.

A multilayer ceramic capacitor having a 0603 size was manufactured by the above-mentioned method. The 0603 size may means a length of 0.6 µm±0.1 µm and a width of 0.3 µm±0.1 µm. Characteristics of the multilayer ceramic capacitor were evaluated as follows.

The following Table 1 illustrates comparison results of measuring and determining connectivity of an electrode depending on an average number of conductive metal particles in an internal electrode pattern in a thickness direction according to the exemplary embodiment in the present disclosure.

TABLE 1

| | Average Number of Conductive Metal Particles in Internal Electrode Pattern in Thickness Direction | Connectivity of Electrode (%) | Determination |
|---|---|---|---|
| 1* | 1 | 60 or less | X |
| 2* | 2 | 71 | X |
| 3 | 2.5 | 80 | ○ |
| 4 | 3 | 85 | ⊚ |
| 5 | 4 | 87 | ⊚ |
| 6 | 5 | 85 | ⊚ |
| 7* | 5.5 | 75 | X |
| 8* | 6 | 72 | X |

[Evaluation]
X: poor,
○: good,
⊚: excellent
*Comparative Example

Referring to Table 1, it may be appreciated that in samples 1 and 2 corresponding to cases in which the average number of conductive metal particles in the internal electrode pattern in the thickness direction was 2 or less, connectivity of the internal electrodes was less than 80%, and thus, it was impossible to implement a high-capacitance multilayer ceramic capacitor.

Further, it may be appreciated that in samples 7 and 8 corresponding to cases in which the average number of conductive metal particles in the internal electrode pattern in the thickness direction was more than 5, connectivity of the internal electrodes was less than 80%, and thus, it was impossible to implement a high-capacitance multilayer ceramic capacitor.

On the contrary, it may be appreciated that in samples 3 to 6 corresponding to cases in which a numerical range of the present disclosure was satisfied, since connectivity of the internal electrode was 80% or more, a high-capacitance multilayer ceramic capacitor having excellent reliability may be implemented.

Figure 5:
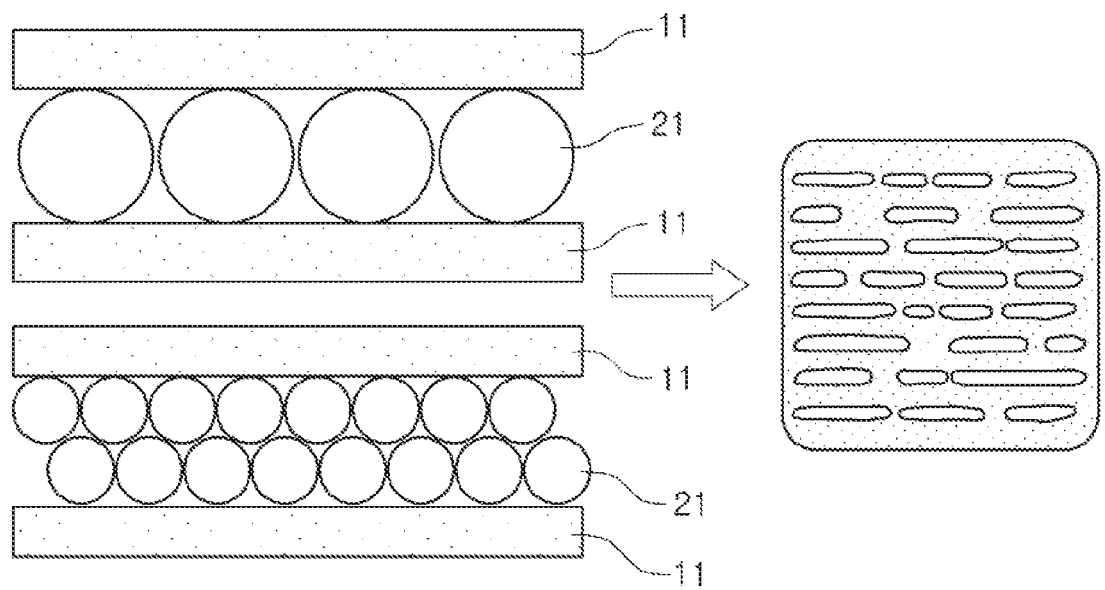
FIG. 5 is mimetic views illustrating cases according to Comparative Example 1 in which the number of conductive metal particles in an internal electrode pattern in a thickness direction before the sintering is 2 or less and a mimetic view illustrating connectivity of internal electrodes after the sintering.

FIG. 5 is mimetic views illustrating cases according to Comparative Example 1 in which the number of conductive metal particles in an internal electrode pattern in a thickness direction before the sintering is 2 or less and a mimetic view illustrating connectivity of internal electrodes after the sintering.

Referring to FIG. 5, reference numeral 11 represents green sheets and reference numeral 21 represents conductive metal particles. In Comparative Example 1 corresponding to cases in which an average number of conductive metal particles in the internal electrode pattern in the thickness direction is 1 and 2, empty spaces may be generated in the electrode at an initial stage before the sintering, such that degradation of connectivity of the electrode may occur, and thus, connectivity of the electrode may be deteriorated. A state in which connectivity of the electrodes after the sintering is deteriorated is illustrated in the mimetic view of FIG. 5.

Figure 6:
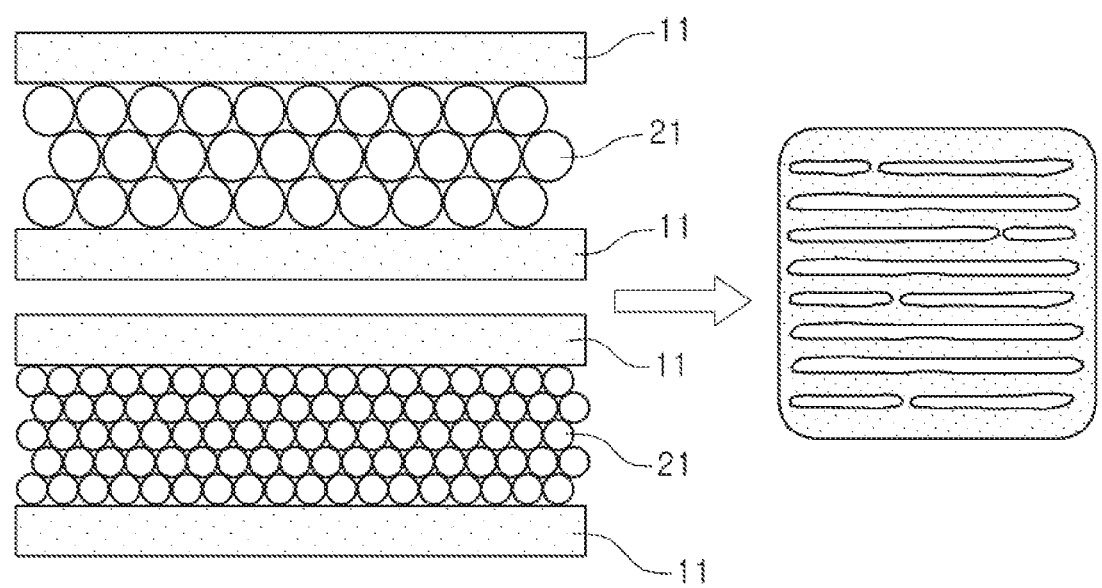
FIG. 6 is mimetic views illustrating cases according to Inventive Example in which the number of conductive metal particles in an internal electrode pattern in a thickness direction before the sintering is 3 and 5 or less and a mimetic view illustrating connectivity of internal electrodes after the sintering.

FIG. 6 is mimetic views illustrating cases according to Inventive Examples in which the number of conductive metal particles in the internal electrode pattern in the thickness direction before the sintering is 3 and 5 or less and a mimetic view illustrating connectivity of internal electrodes after the sintering.

Referring to FIG. 6, reference numeral 11 represents green sheets and reference numeral 21 represents conductive metal particles. In Inventive Example corresponding to cases in which an average number of conductive metal particles in the internal electrode pattern in the thickness direction are 3 and 5, unlike Comparative Example, a growth rate and movement of a grain boundary of the internal electrode during the sintering may be controlled, and thus, an electrode disconnection phenomenon and an electrode aggregation phenomenon may be more effectively improved as compared to Comparative Example. Therefore, a state in which connectivity of the electrodes after the sintering is excellent (80% or more) is illustrated in the mimetic view of FIG. 6.

Figure 7:
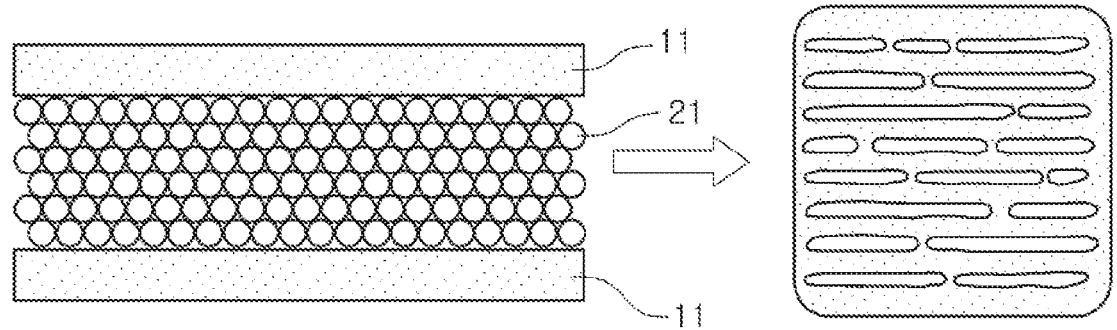
FIG. 7 is a mimetic view illustrating a case according to Comparative Example 2 in which the number of conductive metal particles in an internal electrode pattern in a thickness direction before the sintering is more than 5 and a mimetic view illustrating connectivity of internal electrodes after the sintering.

FIG. 7 is a mimetic view illustrating a case according to Comparative Example 2 in which the number of conductive metal particles in an internal electrode pattern in a thickness direction before the sintering is more than 5 and a mimetic view illustrating connectivity of internal electrodes after the sintering. Reference numeral 11 represents green sheets and reference numeral 21 represents conductive metal particles.

Referring to FIG. 7, in Comparative Example 2 corresponding to a case in which an average number of conductive metal particles in the internal electrode pattern in the thickness direction is 6, the average number of conductive metal particles in the internal electrode pattern coated at a thickness of 0.5 µm or less in the thickness direction needs to be increased. To this end, fine powder may be used, but the internal electrode may be shrunk at a relatively low temperature due to an increase in initial sintering property of the fine powder, such that connectivity of the electrode after the sintering may be deteriorated, and cracks may occur due to an increase in specific surface area of the powder. A state in which connectivity of the electrodes is deteriorated after the sintering is illustrated in the mimetic view of FIG. 7.

As set forth above, according to exemplary embodiments in the present disclosure, the electrode aggregation phenomenon and the electrode disconnection phenomenon may be prevented by disposing the conductive metal particles so that the average number of conductive metal particles in the internal electrode pattern in the thickness direction is more than 2 and 5 or less in the forming of the internal electrode pattern on the ceramic green sheet, such that connectivity of the electrode may not be deteriorated, and thus, the multilayer ceramic electronic component having high capacitance and excellent reliability may be implemented.

While exemplary embodiments have been shown and described above, it will be apparent to those skilled in the art that modifications and variations could be made without departing from the scope of the present invention as defined by the appended claims.

What is claimed is:

1. A method of manufacturing a multilayer ceramic electronic component, the method comprising:

preparing a ceramic green sheet containing a ceramic powder;

forming an internal electrode pattern on the ceramic green sheet using a conductive paste containing conductive metal particles and an additive;

forming a ceramic laminate by stacking the ceramic green sheets on which the internal electrode pattern is formed; and forming a ceramic body including dielectric layers and internal electrodes by sintering the ceramic laminate, wherein an average number of the conductive metal particles directly adjacent to each other in the internal electrode pattern in a thickness direction along which the ceramic green sheets are stacked is more than 2 and 5 or less.

2. The method of claim 1, wherein the average number of the conductive metal particles disposed in the internal electrode pattern in the thickness direction is more than 3 and 5 or less.

3. The method of claim 1, wherein the internal electrode pattern has a thickness of 0.5 µm or less.

4. The method of claim 1, wherein the ceramic green sheet has a thickness of 0.6 µm or less.

5. The method of claim 1, wherein an average number of ceramic powder particles disposed in the ceramic green sheet in the thickness direction is 2 or more to 10 or less.

6. The method of claim 1, wherein connectivity of the internal electrode defined as a ratio of a length of an actual internal electrode to a total length of the internal electrode is 80% or more.

7. The method of claim 1, wherein after the sintering, one of the internal electrodes has a thickness of 0.4 µm or less.

8. The method of claim 1, wherein after the sintering, one of the dielectric layers has a thickness of 0.4 µm or less.

9. The method of claim 1, further comprising forming external electrodes on surfaces of the ceramic body to electrically connect to the internal electrodes exposed from the surfaces of the ceramic body, respectively.

* * * * *